Figure 4:
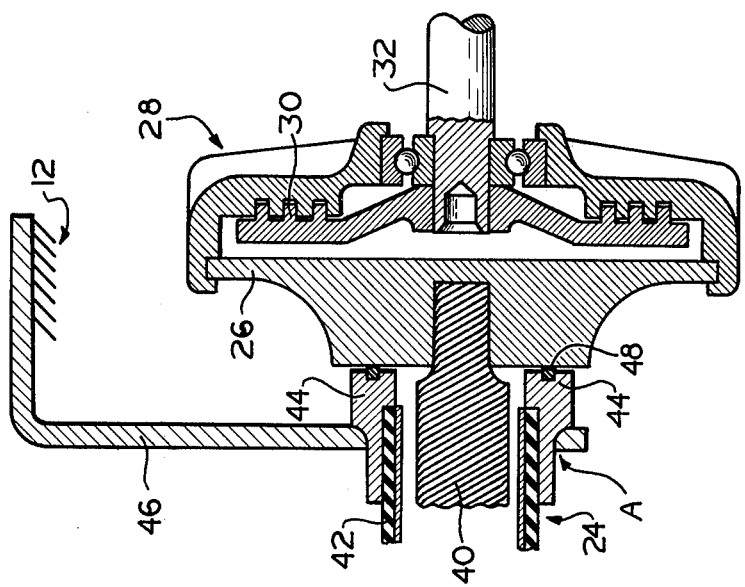

United States Patent [19]

Boyd

[11] 4,040,272
[45] Aug. 9, 1977

[54] FLEXIBLE DRIVE FOR ROTATING A FAN

[75] Inventor: Keith A. Boyd, Marshall, Mich.

[73] Assignee: Eaton Corporation, Cleveland, Ohio

[21] Appl. No.: 652,259

[22] Filed: Jan. 26, 1976

[51] Int. Cl.² ............................................. F16D 3/00
[52] U.S. Cl. ........................................ 64/26; 64/2 R; 192/57; 123/41.46; 415/122 R
[58] Field of Search ............ 415/122 R; 64/2 R, 2 P, 64/1 V, 26; 123/41.46; 192/57

[56] References Cited

U.S. PATENT DOCUMENTS

| | | | |
|---|---|---|---|
| 1,082,243 | 12/1913 | Shelton | 415/122 R |
| 1,415,689 | 5/1922 | Parent | 415/122 R |
| 1,636,038 | 2/1927 | Bolozky et al. | 415/122 R |
| 2,788,198 | 4/1957 | Anderson | 415/122 |
| 2,963,135 | 12/1960 | Weir | 192/57 |
| 3,613,645 | 10/1971 | Froumajou | 123/41.46 |

Primary Examiner—Samuel Scott
Assistant Examiner—Randall Heald
Attorney, Agent, or Firm—Teagno & Toddy

[57] ABSTRACT

An accessory drive for rotating a fan used to cool a transversely mounted engine in a vehicle. A declutchable device, such as a viscous fan drive, has one element driven by the engine. The other element is connected to one end of the core of an elongated flexible shaft. The other end of the core is connected to the fan which is mounted in a known manner relative to the radiator of the vehicle to draw cooling air through the radiator and thereby cool the engine. The mounting of the declutchable device ahead of the flexible shaft allows for a reduction in the angular velocity of the core thereby increasing the life of the flexible shaft.

12 Claims, 4 Drawing Figures

4,040,272

FLEXIBLE DRIVE FOR ROTATING A FAN

The present invention relates to a flexible drive for rotating a cooling fan located in a vehicle.

In order to obtain maximum cooling of a water cooled engine used to propel a vehicle, the radiator of the vehicle is disposed in a plane perpendicular to the direction of the vehicle's movement. A fan is usually disposed parallel to and to the rear of the radiator for the purpose of drawing air through the radiator and cooling the liquid therein. In most vehicle applications in the United States of America, the engine is mounted so that the crankshaft is extending axially in the direction of vehicle movement. The fans in such arrangements are located to be driven through a series of belts from the engine crankshaft.

In instances where the engine is mounted transverse to the movement of the vehicle difficulties are encountered with the driving of the fan by the crankshaft since the axis of the crankshaft and the axis of the fan are roughly 90° relative to one another. Driving the fan from either the transmission or engine would require a complex system of belts and shafts used to direct the rotational movement from the prime mover to the fan. One such arrangement, employing a pair of rigid shafts rotatably connected by beveled gears, is illustrated in U.S. Pat. No. 3,613,645. Another more popular arrangement makes use of an auxiliary electric motor to drive the fan. The use of an electric motor is relatively costly and affords only limited power while the rigid shaft-bevel gear arrangement is even more costly and is relatively complex.

Accordingly, an object of the invention is to provide a relatively inexpensive, simple accessory drive for transmitting power directly from a rotating shaft to a fan without the use of gears or electric motors.

Another object of the invention is to provide a simple and relatively inexpensive means for transferring power from the output shaft of a transverse mounted engine of a vehicle to a cooling fan used to cool the radiator of the vehicle.

Figure 1:
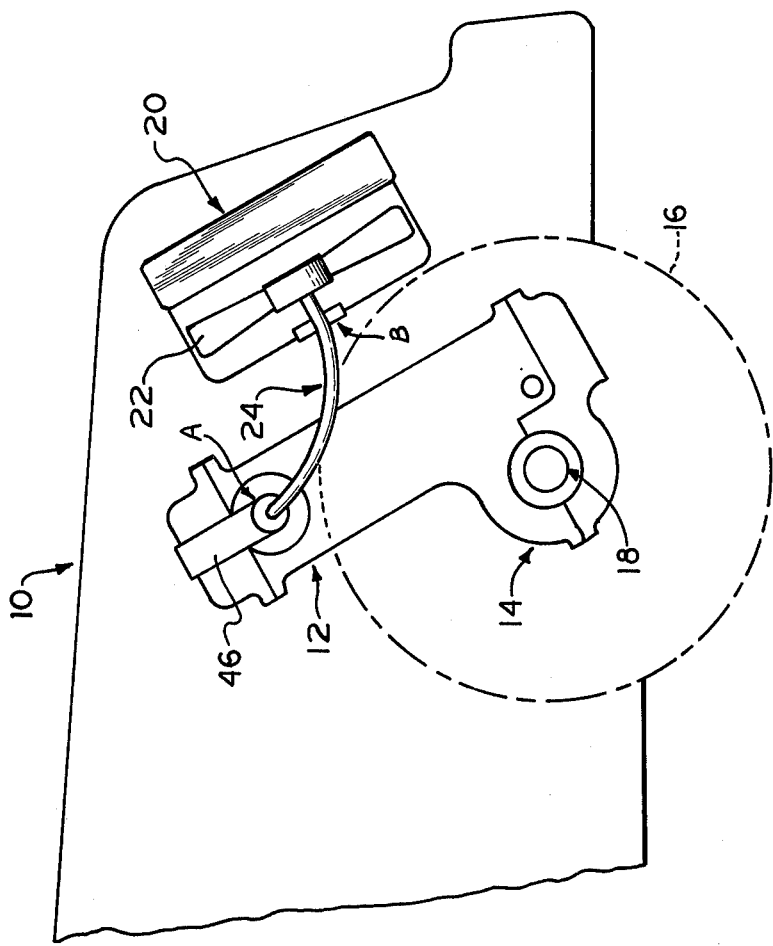

FIG. 1 schematically illustrates a side view of a vehicle having a transverse mounted engine and incorporating one embodiment of the invention.

Figure 2:
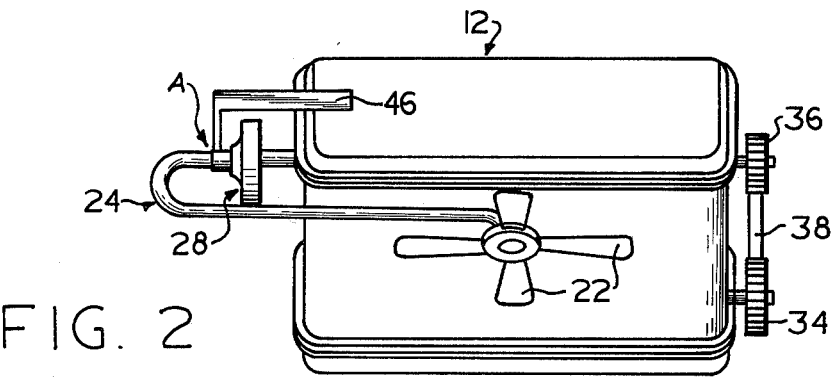
Figure 3:
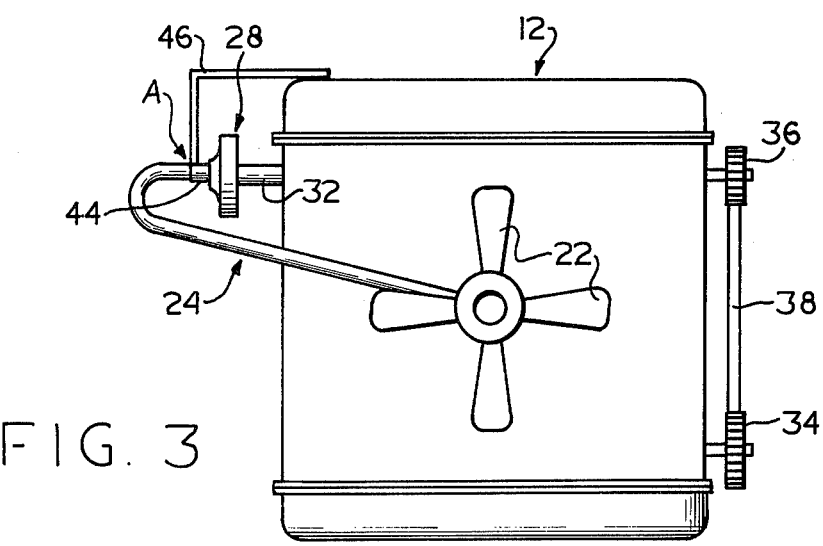

FIGS. 2 and 3 schematically illustrate top and front view respectively of the engine of FIG. 1.

FIG. 4 is an enlarged sectional view of a portion of FIG. 3.

FIGS. 1 to 3 illustrate a vehicle 10 having a transverse mounted engine 12 operationally connected to a transmission 14 that rotates a pair of drive wheels 16 through an axle 18. The engine is cooled via liquid which flows through a radiator 20 which is disposed in a plane perpendicular to the direction of movement of vehicle 10. A fan 22 is disposed parallel to and to the rear of radiator 20 and is used to force cooling air through the radiator to cool the fluid therein in a known manner.

Fan 22 is supported in a known manner by a shaft mounted in a pair of bearings. The shaft in turn is driven by an elongated flexible shaft 24 which is connected at one end to the fan shaft and at the other end to the output element 26 of a viscous fluid coupling 28 (FIG. 4). The input element 30 of coupling 28 is rotated, for example, through a shaft 32 rotated by the crankshaft 34 of engine 12. As illustrated crankshaft 34 drives a camshaft 36 of engine 12 through a belt 38. Camshaft 36 in turn rotates shaft 32 of coupling 28 via gearing at an angular velocity that is 1.2 times greater than the angular velocity of crankshaft 34. The 1.2 ratio may be varied depending upon fan design and desired engine cooling.

Coupling 28 may be any device in which provisions are made to rotate the output element 26 at or close to the angular velocity of the input element 30 during relatively low angular velocities of input element 30 and to provide for rotation of output element 28 at substantially lower angular velocities from that of input element 30 during relatively high angular velocities of input element 30. Coupling 28 may take the form of a viscous fan drive such as illustrated in U.S. Pat. No. 2,963,135 or in copending U. S. patent application Ser. No. 528,542 filed Nov. 29, 1974, a hydrokinetic coupling, or a wet or dry clutch that is pneumatically or hydraulically operated between on-off positions. The preceding list of couplings is intended only as a representative selection of devices capable of accomplishing the desired result.

For the purpose of this disclosure, an elongated flexible shaft is defined as a member having a flexible core 40, made up of layers of wire, which rotate inside a tubular flexible casing 42. The casing is used not only to support the core but also to act as a bearing surface for the core. Such flexible shafts are well known and are generally used to transmit rotary power or motion through a curved path between two shafts which are not co-linear, and/or have relative motion. They are readily available through companies such as the S. S. White Industrial Products Division of Pennwalt Corporation and the Stow Manufacturing Company.

Casing 42 of elongated flexible shaft 24 is preferably supported in a known manner, at, for example points A and B. Other support points may also be provided to prevent vibration of casing 42. Further, it is preferred to attach flexible core 40 of elongated flexible shaft 24 along the axis of rotation of fan 22 and coupling 28. Both ends of casing 42 of elongated flexible shaft 24 are sealed to retain lubricant within the casing. In FIG. 4 the casing is retained at point A through an annular rign 44 supported by a bracket 46 mounted on engine 12. An annular seal 48 on ring 44 makes rubbing contact with output element 26 of coupling 28 to provide the desired seal of casing 42 for lubricant retention.

It is contemplated that output element 26 may be driven and input element 30 may be attached to flexible core 40 of elongated flexible shaft 24. Further, it is contemplated that coupling 28 may be driven through the lubrication pump, distributor shaft, crankshaft, camshaft or other outputs from engine 12.

It is significant to the disclosure that coupling 28 be mounted between driving shaft 32 from engine 12 and elongated flexible shaft 24. By mounting the coupling in this manner the peak angular velocity of core 40 of elongated flexible shaft 24 can be greatly reduced from a mounting wherein the coupling is located between the core of the elongated flexible shaft and the fan. For example,in a typical application with a viscous fluid coupling mounted between shaft 32 and elongated flexible shaft 24 and the engine operating at 5000 rpm, the core of the elongated flexible shaft will be rotating at 2500 rpm and transmitting 1.0 lbs. ft. (0.1383Kg-m) of torque. With the coupling mounted between the elongated flexible shaft and the fan, the core of the elongated flexible shaft will be rotating at 6000 rpm at the previously listed torque. Without the coupling the core of the elongated flexible shaft would be rotating at 6000 rpm and transmitting 5.29 lbs. ft. (0.732Kg-m) of torque.

What is claimed is:

1. An accessory drive for rotating a fan used to cool a prime mover of a vehicle, the prime mover having an output shaft adapted for rotation, the drive comprising:
   A. an elongated flexible shaft terminating at a pair of ends;
   B. a declutchable device having
      1. an input element,
      2. an output element, and
      3. means to transmit torque between the input element and the output element in response to rotation of one of the elements and to restrict such torque transmission during rotation of one of the elements, said torque transmitting means comprising said input element and said output element cooperating to define a shear space, a viscous fluid being contained within said shear space to transmit torque by viscous shear stress;
   C. first means for securing one of the elements to the output shaft for corresponding rotational movement;
   D. second means for securing one end of the flexible shaft to the fan for corresponding rotational movement; and
   E. third means securing the other end of the flexible shaft to the other element for corresponding rotational movement.

2. An accessory drive for rotating a fan used to cool a prime mover of a vehicle, the prime mover having an output shaft adapted for rotation, the drive comprising:
   A. an elongated flexible shaft terminating at a pair of ends;
   B. a fluid coupling having
      1. a first element defining a housing rotatable about an axis,
      2. a second element disposed in the interior of said housing and rotatable about the axis, and
      3. a working chamber defined by the elements and containing an inventory of fluid for transmitting torque from one of the elements to the other of the elements in response to rotation of one of the elements;
   C. first means for securing one of the elements of the fluid coupling to the output shaft for corresponding rotational movement;
   D. second means for securing one end of the flexible shaft to the fan for corresponding rotational movement; and
   E. third means securing the other end of the flexible shaft to the other element of the fluid coupling for corresponding rotational movement.

3. An accessory drive according to claim 2 wherein:
   F. the fluid is viscous fluid; and
   G. torque is transmitted between the elements of the fluid coupling by fluid shear stress.

4. An accessory drive according to claim 2 wherein:
   F. the first means is for securing the first element of the coupling to the output shaft.

5. An accessory drive according to claim 2 wherein:
   F. the first means is for securing the second element of the coupling to the output shaft.

6. An accessory drive according to claim 1 wherein the axis of rotation of the declutchable device and the axis of rotation of the fan are transversely spaced apart.

7. An accessory drive according to claim 6 wherein the axis of rotation of the fan is oriented approximately perpendicular to the axis of rotation of the declutchable device.

8. An accessory drive according to claim 2 wherein the axis of rotation of the fluid coupling and the axis of rotation of the fan are transversely spaced apart.

9. An accessory drive according to claim 8 wherein the axis of rotation of the fan is oriented approximately perpendicular to the axis of rotation of the fluid coupling.

10. An accessory drive according to claim 1 wherein said declutchable device defines a fluid reservoir chamber and includes valve means for controlling the flow of fluid from said fluid reservoir chamber into said shear space.

11. An accessory drive for rotating a fan used to cool a prime mover of a vehicle, the prime mover having an output shaft adapted for rotation, the drive comprising:
    A. an elongated flexible shaft terminating at a pair of ends;
    B. a declutchable device having
       1. an input element,
       2. an output element, and
       3. means to transmit torque from the input element to the output element, the rotational speed of the output element being approximately the same as that of the input up to a certain rotational speed of the input element, the rotational speed of the output element increasing by only a relatively small amount as the rotational speed of the input element increases beyond said certain rotational speed;
    C. first means for securing one of the elements to the output shaft for corresponding rotational movement;
    D. second means for securing one end of the flexible shaft to the fan for corresponding rotational movement; and
    E. third means securing the other end of the flexible shaft to the other element for corresponding rotational movement.

12. An accessory drive according to claim 11 wherein the declutchable device is a viscous fluid coupling and torque is transmitted from the input element to the output element by fluid shear stress.

* * * * *